United States Patent [19]

Luttrell

[11] 4,210,260

[45] Jul. 1, 1980

[54] SKIP ROW ATTACHMENT FOR PLANTER

[76] Inventor: Wondall R. Luttrell, P.O. Box 504, Clarendon, Tex. 79226

[21] Appl. No.: 923,256

[22] Filed: Jul. 7, 1978

[51] Int. Cl.² .................... B65G 29/00; A01C 7/04
[52] U.S. Cl. ................................. 221/278; 111/69
[58] Field of Search ............... 221/278, 211; 222/486, 222/330; 111/69

[56] References Cited

U.S. PATENT DOCUMENTS

| | | | |
|---|---|---|---|
| 2,698,114 | 12/1954 | Buhr | 222/486 X |
| 3,731,842 | 5/1973 | Schlegel | 221/278 |
| 3,790,026 | 2/1974 | Neumeister | 221/211 |

Primary Examiner—Allen N. Knowles
Attorney, Agent, or Firm—Clarence A. O'Brien; Harvey B. Jacobson

[57] ABSTRACT

An attachment for a device for planting parallel rows of seeds from a single seed box is disclosed whereby selected rows can be planted or skipped as selected by the user. A frame has a linear equally spaced array of a plurality of inlet nipples, and a slide bar having a plurality of outlet nipples in register with the inlet nipples can be displaced by the distance of separation between nipples to place a different set of inlet and outlet nipples in register. Planting with the slide bar alternatingly displaced causes a row to be alternately planted and skipped to provide desired seed spacing.

11 Claims, 5 Drawing Figures

SKIP ROW ATTACHMENT FOR PLANTER

BACKGROUND OF THE INVENTION

1. Field of the Invention

The invention relates to an improvement in a farm implement for planting a plurality of parallel rows of seeds which are stored in a single seed box. More particularly, use of the attachment of the present invention with a conventional planter permits the user to skip certain rows in order to provide a desired spacing pattern of planted seeds. The invention is particularly useful in combination with a multiple row seed planter having a single seed hopper and an air pressurized rotating seed drum for dispensing seed into outlets connected by flexible tubing for transfer to the desired row in the ground. Interposition of the attachment of the present invention in such tubing permits skipping of rows to produce the desired spacing of seeds planted.

2. Description of the Prior Art

U.S. Pat. No. 3,314,575 to Graham, issued Apr. 18, 1967, shows a seed dispensing apparatus with a diverter slidably mounted on a hopper for metering seed from the hopper and distribution in a predetermined pattern. The Graham patent, focusing on metering of seed, fails to allow a user to select a skip-row planting pattern to achieve a desired seed spacing distribution.

U.S. Pat. No. 3,633,522, issued Jan. 11, 1972, to Main, shows a sod seeder to selectively seed parallel rows so that the seed will be distributed evenly and at a constant rate. It is to avoid the even and constant rate of seed deposition that the attachment of the present invention was designed, and instead, the user can skip seed rows as desired to produce an optimum seed spacing pattern.

Other patents showing seed metering devices and illustrating generally the prior art are as follows:

U.S. Pat. Nos:
2,732,975—Jan. 31, 1956
3,411,467—Nov. 19, 1968
3,453,977—July 8, 1969
3,489,321—Jan. 13, 1970
3,633,489—Jan. 11, 1972.

SUMMARY OF THE INVENTION

The invention provides an attachment for a seed planter for skipping rows of seed to be planted in order to produce a desired planting pattern, thereby achieving an optimum or desired spacing between planted seeds. In a conventional seed planter, a plurality of parallel rows of seeds is formed by deposition of one seed in each row simultaneously. In order to avoid problems of crowding caused by close spacing of seeds in adjacent rows, the present invention provides for intermittent skipping of the seed planted in one or more of the rows. A frame having a linear equally spaced array of inlet nipples with an associated slide bar has outlet nipples in register with the inlet nipples on the frame. The slide bar can be mechanically displaced by the distance of separation between two adjacent nipples to cause redistribution of seed passing through the device with the slide bar displaced. If, for example, a conventional rotary air pressurized drum is used to feed four inlet hoses with seeds passing to four inlet nipples which feed a different four of the outlet nipples when displaced than when not displaced, four rows will be planted when the slide bar is not displaced, and one of the four rows will be skipped when the slide bar is displaced. Various planting patterns can be selected by the user by the arrangement of connection of inlet hoses to inlet nipples and by the sequence of displacing or not displacing the slide bar during planting operations.

An object of the invention is to provide an attachment enabling a user to easily skip a row of seed planted by a conventional multiple row planter.

Another object of the invention is to enable rapid, easy, and relatively inexpensive adaptation of existing equipment to skip row planting.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
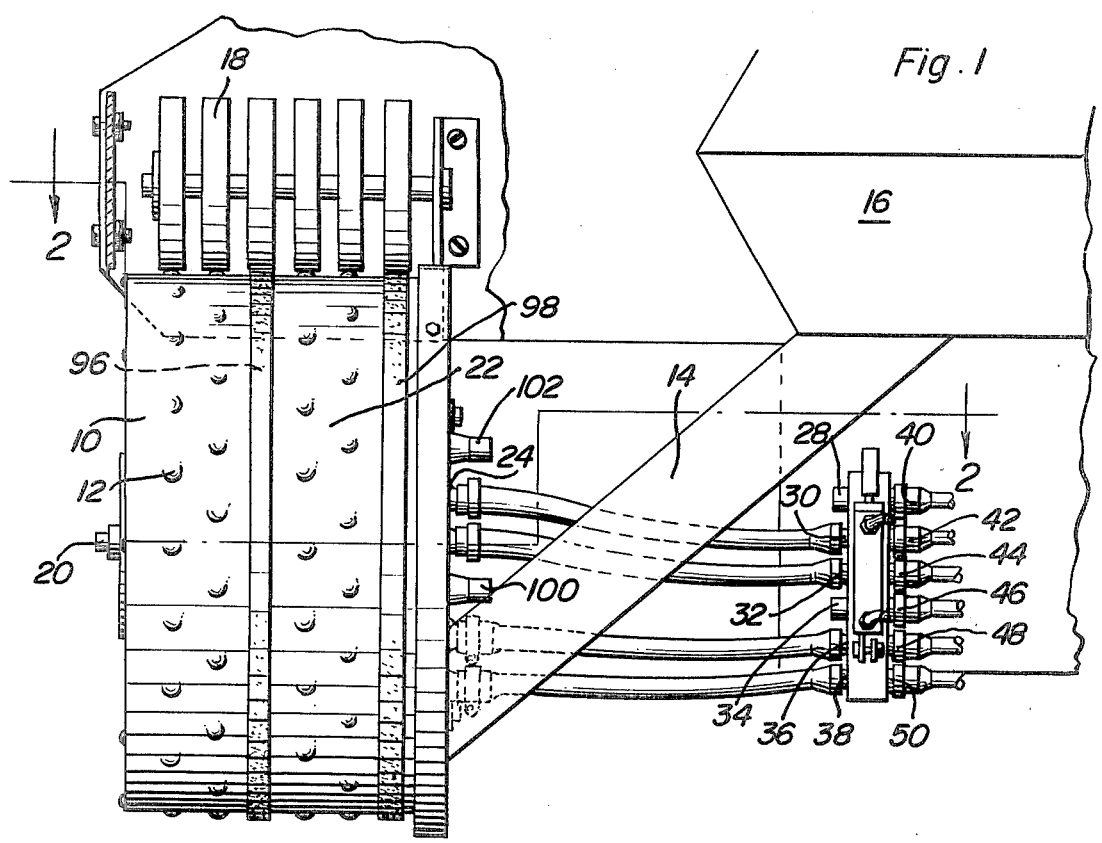
FIG. 1 is a side elevational view of a portion of a conventional planter illustrating the rotary air pressurized drum thereof and the attachment for skip-row planting of the present invention associated therewith.
Figure 2:
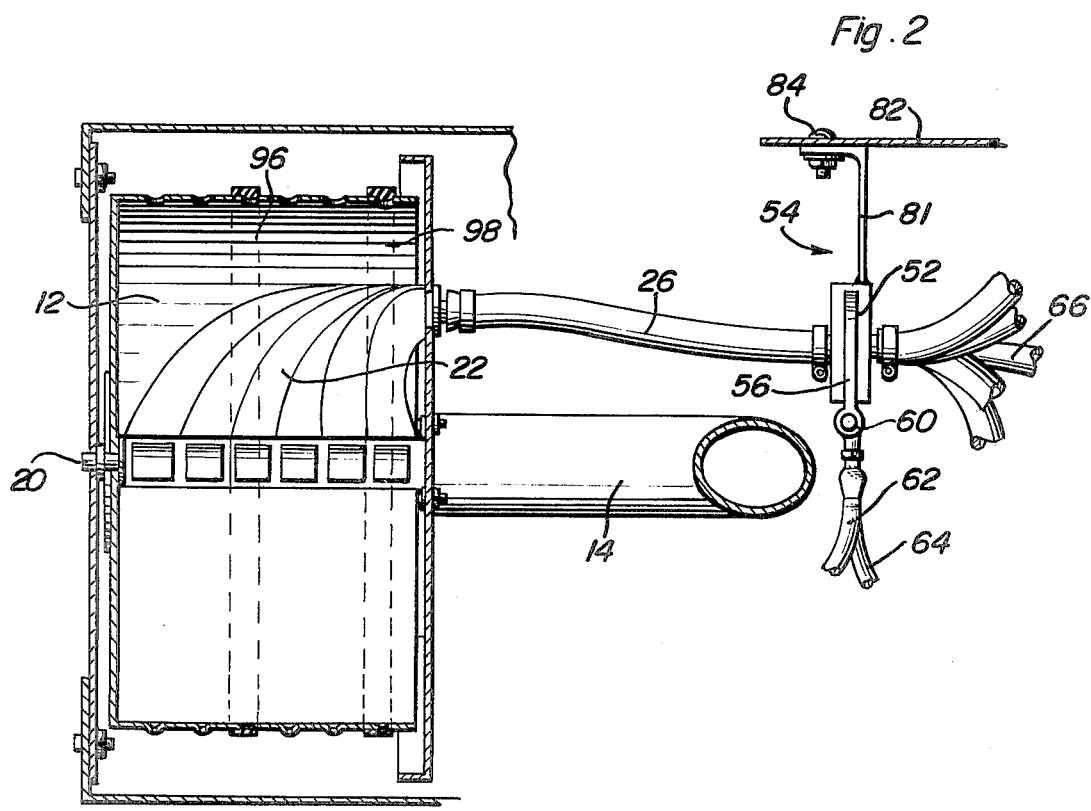
FIG. 2 is a top sectional view taken substantially upon a plane passing along section line 2—2 of FIG. 1, showing the same equipment as FIG. 1.
Figure 3:
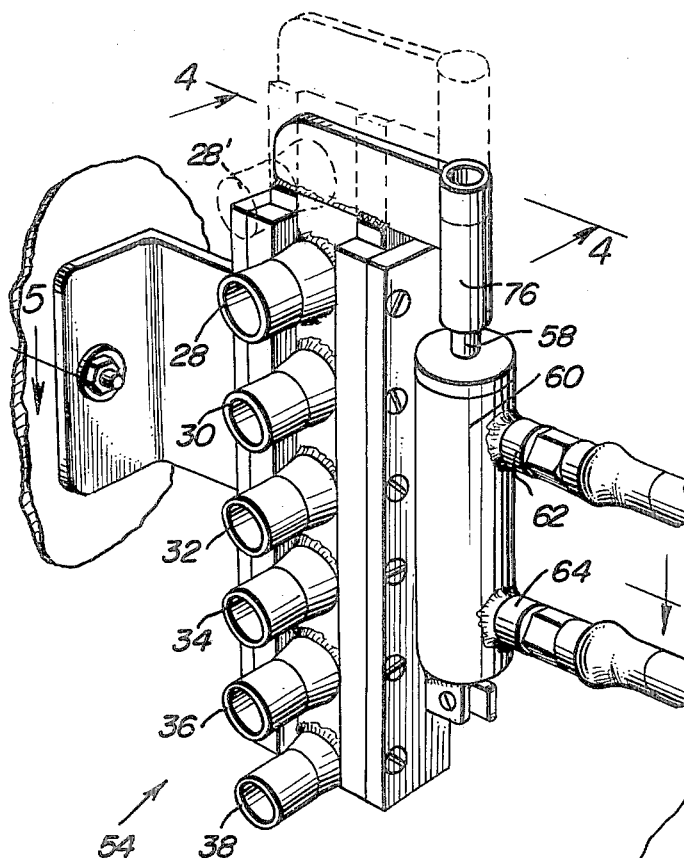
FIG. 3 is an enlarged, perspective view of the skip row attachment of the present invention.
Figure 4:
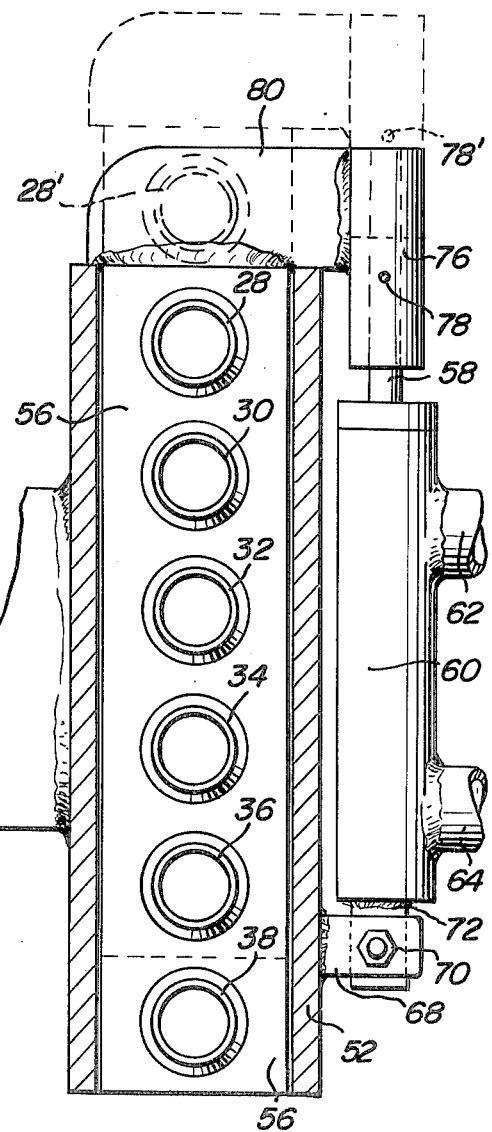
FIG. 4 is a vertical, sectional view taken upon a plane passing substantially along section line 4—4 of FIG. 3, showing the skip row attachment.
Figure 5:
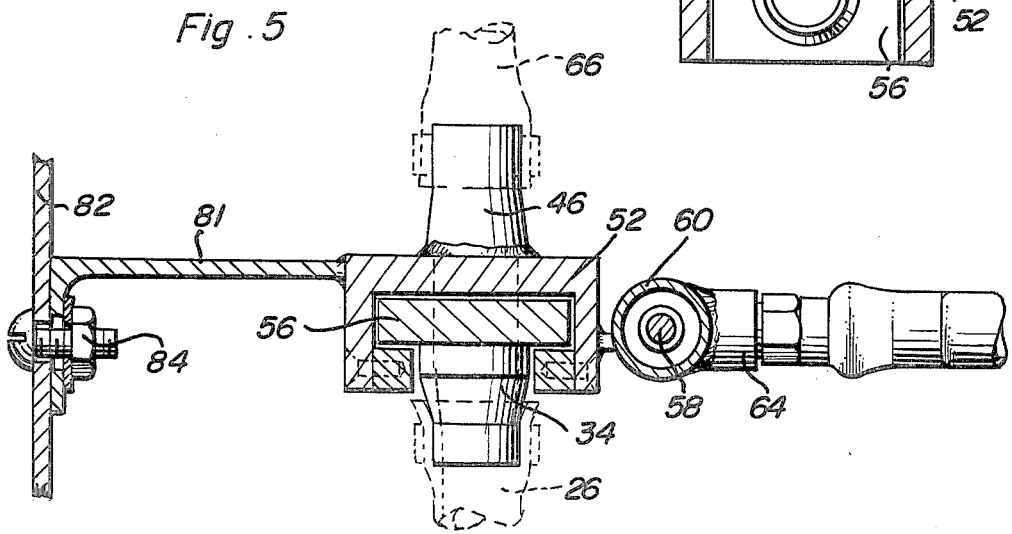
FIG. 5 is a top sectional view taken substantially upon a plane passing along section line 5—5 of FIG. 3, showing the attachment of the present invention.

FIG. 1 shows a conventional planting device comprising rotary air pressurized seed drum 10 perforated with raised pockets 12, each for holding a seed delivered through seed delivery tube 14 from hopper 16 to drum 10. Seed release wheels 18 rotate against pockets 12 as drum 10 rotates about axle 20. Air pressure is furnished to the interior of seed drum 10 which is sealed to permit maintenance of a positive air pressure by a blower (not shown) and as seed release wheels 18 cover each pocket 12 at the uppermost position of rotation of drum 10, seeds which were held in pocket 12 by force resulting from air pressure within drum 10 fall vertically as one of release wheels 18 covers pocket 12. Falling into one of seed discharge manifolds 22, the seed then travels to seed manifold outlet 24, and thence through inlet hose 26, fastened to seed manifold outlet 24 at one end and to inlet nipple 30 at the other end. Inlet nipples 28–38, best seen in FIG. 5, receive one seed in each hose and deliver the seed to the corresponding outlet nipple in register therewith. Outlet nipples 40–50 are shown in FIG. 2 and are attached to frame 52 of the skip row attachment shown generally by the numeral 54. Inlet nipples 28–38 form part of slide bar 56, housed within frame 52. Slide bar 56 is longitudinally displaceable within frame 52 by action of piston 58 of cylinder 60, piston 58 having a stroke equal in length to the distance of separation between nipples 28 and 30. Extension of piston 58 then causes nipple 30 to be in alignment with outlet nipple 40, instead of outlet nipple 42. Such displacement is indicated in phantom in FIGS. 3 and 4. Cylinder 60 can be of hydraulic or pneumatic type, receiving and discharging hydraulic fluid or compressed air through inlet connector and outlet connector 62 and 64, respectively. Preferably, cylinder 60 is a hydraulic cylinder operating from the hydraulic supply of a tractor associated with the planter device. Outlet hoses 66 are connected to outlet nipples 40 through 50, and each of hoses 66 is connected to apparatus for delivering the seed into a furrow along which the planter is driven. With six outlet hoses 66, there are six parallel furrows into which seed is deposited from the corresponding outlet hose. Tab 68 can be fastened to projection 72 of cylinder 60 by bolting means 70 or by a rivet. Shaft connector 76 is attached to piston 58 by roll pin 78, and bar 80, welded to shaft connector 76 and slide bar 56 transmits longitudinal displacement of piston 58 to slide bar 56. Frame 52 is welded to mounting bracket 81, which is bolted to frame 82 of the planter by bolting means 84.

To operate the device connected as in FIGS. 1 and 2, with four inlet hoses and six outlet hoses, the user plants four rows at one time. Rubber bands 96 and 98 cover the drum to prevent seed from travelling through manifold 22 to the seed discharge tubes 100 and 102 without inlet hoses 26. FIG. 1 shows skip row attachment 54 in undisplaced configuration, where seed is delivered into outlet nipples 42, 44, 48 and 50 and thence into the corresponding furrows in the ground. When displaced, as shown in broken outline in FIGS. 3 and 4, the inlet nipples 30, 32, 36 and 38 will correspond with outlet nipples 40, 42, 46 and 48, respectively, causing seed to be delivered to the outlet hoses 66 corresponding thereto. The result is a skipping of two of the four rows planted when the device of the present invention is alternately moved. In this way, the user can plant a strip to the end of a field, reverse the direction of travel to plant an adjacent strip, activate slide bar 56 of the invention, and continue planting the strip adjacent the completed strip with uniform spacing between planted rows of both strips. It should be noted that rubber bands 96 and 98 prevent deposition of seed into manifold 22 in those channels corresponding to seed tube connectors 100 and 102.

Alternatively, rubber bands 96 and 98 can be removed, with six inlet hoses 26 connecting all seed tube connectors to inlet nipples on the device. Operated in such a configuration, all six rows would be planted without reciprocating operation of attachment 54 to give skipping of rows. Accordingly, with the rubber bands removed, planting occurs as though no attachment were present.

An advantage of the attachment of the present invention is that the attachment can be used with a device having a single unit to replace separate seed boxes used in certain prior art devices which permit skip row planting where one seed box is present for each row planted. This results in more efficient skip row operation, with reduced likelihood of jamming or malfunction of one of the seed boxes, and has the advantage of over-all simplicity of design.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a planter for planting of seeds in a plurality of planting rows, the improvement comprising an attachment having directing means for directing seed alternatingly into planted rows and away from skipped rows, said seed planter having a common seed storage receptacle, wherein said planter is of the rotating air pressurized drum type and has a plurality of seed tube connectors for discharge of seed into corresponding seed tubes leading to said planting rows, and wherein said directing means is interposed between sections of said seed tubes, whereby a strip can be planted to the end of a field, the planter reversed in its direction of travel to plant an adjacent strip, said directing means being pneumatically or hydraulically activated, and the planter can continue planting the adjacent strip with uniform spacing between planted rows of both strips.

2. In a planter for planting of seeds in a plurality of planting rows, the improvement comprising an attachment having directing means for directing seed alternatingly into planted rows and away from skipped rows, said seed planter having a common seed storage receptacle, wherein said planter is of the rotating air pressurized drum type and has a plurality of seed tube connectors for discharge of seed into corresponding seed tubes leading to said planting rows, and wherein said directing means is interposed between sections of said seed tubes, wherein said directing means comprises a slide bar having equally spaced linearly disposed inlet nipples in register with linearly disposed outlet nipples on a frame slidably holding said slide bar, said slide bar being reciprocally slidable in said frame by activating means for a distance which permits displaced inlet nipples to be in register with said outlet nipples.

3. The planter of claim 2 wherein said distance is equal to the distance of separation between adjacent inlet nipples.

4. The planter of claim 2 wherein said inlet nipples are six in number, said outlet nipples are six in number, and four of said six inlet nipples are connected to receive said seed.

5. The planter of claim 3 wherein said activating means is a piston housed in a cylinder and operated by pressurized cylinder fluid.

6. The planter of claim 5 together with a transporting device having an engine with pump means to generate pressurized hydraulic fluid, wherein said pressurized cylinder fluid to operate said piston is generated by said pump means.

7. The planter of claim 6 wherein said cylinder is mounted along said frame, the frame comprising a C-shaped channel with attached guides for retention of said slide bar, said piston being connected to said slide bar by attaching means.

8. The planter of claim 7 wherein the end of said cylinder remote from said piston is secured to a tab welded to said frame and said attaching means comprises a shaft connector welded to a connector plate attached to said slide bar.

9. A method of operating the planter of claim 8 comprising the steps of:
    (a) adjusting said planter to provide seed to less than the full number of said inlet nipples;
    (b) operating said planter with said slide bar in the retracted position;
    (c) operating said planter with said slide bar in the extended position; and
    (d) alternatingly repeating steps (b) and (c) to achieve skip row planting.

10. The method of claim 9, wherein said full number of inlet nipples is six and said planter is adjusted to provide seed to four inlet nipples.

11. The method of claim 10, wherein said four inlet nipples constitute two pairs of adjacent nipples separated by a single nipple.

* * * * *